(12) United States Patent  (10) Patent No.: US 8,509,526 B2
Haas et al.  (45) Date of Patent: *Aug. 13, 2013

(54) DETECTION OF OBJECTS IN DIGITAL IMAGES

(75) Inventors: Norman Haas, Mt. Kisco, NY (US); Ying Li, Mohegan Lake, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/086,023

(22) Filed: Apr. 13, 2011

(65) Prior Publication Data

US 2011/0249867 A1 Oct. 13, 2011

Related U.S. Application Data

(60) Provisional application No. 61/323,673, filed on Apr. 13, 2010.

(51) Int. Cl.
*G06K 9/00* (2006.01)
(52) U.S. Cl.
USPC .......................................................... 382/162
(58) Field of Classification Search
None
See application file for complete search history.

(56) References Cited

U.S. PATENT DOCUMENTS

| | | | | |
|---|---|---|---|---|
| 7,212,651 | B2 * | 5/2007 | Viola et al. | 382/103 |
| 7,526,103 | B2 | 4/2009 | Schofield et al. | |
| 8,111,913 | B2 * | 2/2012 | Dunn et al. | 382/162 |
| 8,165,401 | B2 * | 4/2012 | Funayama et al. | 382/190 |
| 2006/0034484 | A1 | 2/2006 | Bahlmann et al. | |
| 2006/0098877 | A1 | 5/2006 | Barnes et al. | |
| 2006/0177100 | A1 | 8/2006 | Zhu et al. | |
| 2009/0034791 | A1 | 2/2009 | Doretto et al. | |
| 2009/0067805 | A1 | 3/2009 | Kuroda et al. | |

(Continued)

FOREIGN PATENT DOCUMENTS

CN 101655914 2/2010

OTHER PUBLICATIONS

Overett, G., et al., "Fast Features for Time Constrained Object Detection," IEEE Conference on Computer Vision an Pattern Recognition, Jun. 20-25, 2009, pp. 23-30, 978-1-4244-3993-5/09, copyright 2009 IEEE.

(Continued)

*Primary Examiner* — Vikkram Bali

(74) *Attorney, Agent, or Firm* — Thomas Grzesik; Fleit Gibbons Gutman Bongini & Bianco PL

(57) ABSTRACT

A system and method to detect objects in a digital image. At least one image representing at least one frame of a video sequence is received. A given color channel of the image is extracted. At least one blob that stands out from a background of the given color channel is identified. One or more features are extracted from the blob. The one or more features are provided to a plurality of pre-learned object models each including a set of pre-defined features associated with a pre-defined blob type. The one or more features are compared to the set of pre-defined features. The blob is determined to be of a type that substantially matches a pre-defined blob type associated with one of the pre-learned object models. At least a location of an object is visually indicated within the image that corresponds to the blob.

10 Claims, 15 Drawing Sheets

(56) References Cited

U.S. PATENT DOCUMENTS

2009/0161912 A1* 6/2009 Yatom et al. .................. 382/103
2010/0067805 A1 3/2010 Klefenz
2012/0314030 A1* 12/2012 Datta et al. ...................... 348/44

OTHER PUBLICATIONS

Barnes, N., "Improved Signal to Noise Ratio and Computational Speed for Gradient-Based Detection Algorithms," IEEE Conference Robotics and Automation, Apr. 18-22, 2005, pp. 4661-4666, 0-7803-8914-X05, copyright 2005 IEEE.

Chen, Q., "Hand Detection with a Cascade of Boosted Classifiers Using Haar-Like Features," Discover Lab, SITE, University of Ottawa, May 2, 2006, www.discover.uottawa.ca.

Dalal, N., et al., "Histograms of Oriented Gradients for Human Detection," In Proceedings of IEEE Conference Computer Vision and Pattern Recognition, San Diego, CA, USA, pp. 886-893, Jun. 2005.

Chen, X., et al., "AdaBoost Learning for Detecting and Reading Text in City Scenes," Proceedings of IEEE Conference on Computer Vision and Pattern Recognition, CVPR. Jun. 2004.

Overett, G., et al., Boosting a Heterogeneous Pool of Fast HOG Features for Pedestrian and Sign Detection, IEEE Intelligent Vehicles Symposium, Jun. 3-5, 2009, pp. 584-590.

Non-Final Office Action dated Dec. 24, 2012 for U.S. Appl. No. 13/614,760.

* cited by examiner

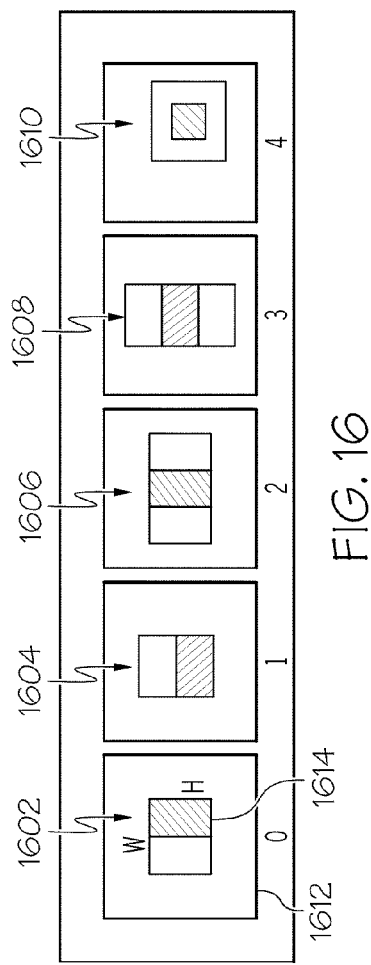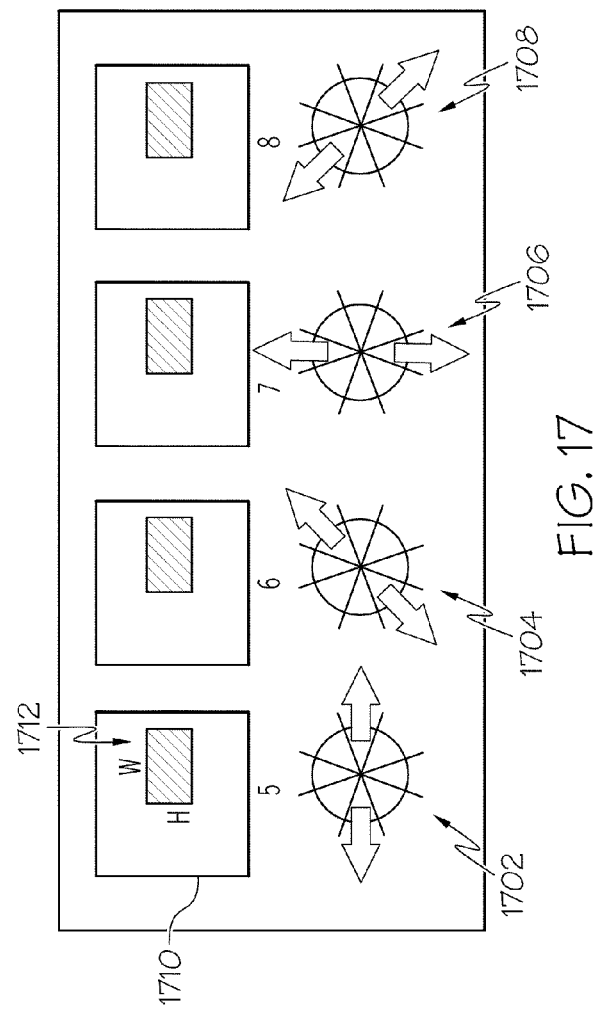

FIG. 22

DETECTION OF OBJECTS IN DIGITAL IMAGES

CROSS-REFERENCE TO RELATED APPLICATIONS

This application is based upon and claims priority to U.S. Provisional Patent Application Ser. No. 61/323,673 filed Apr. 13, 2010 the disclosure of which is hereby incorporated by reference in its entirety.

The present patent application is related to commonly owned U.S. patent application Ser. No. 13/085,985, entitled "Object Recognition Using Haar Features and Histograms of Oriented Gradients", filed on Apr. 13, 2011, the entire teachings of which being hereby incorporated by reference.

FIELD OF THE INVENTION

The present invention generally relates to the detection of objects in digital images, and more particularly relates to detecting objects in digital images using camera sensors deployed in a human assistive environment.

BACKGROUND OF THE INVENTION

Digital image based object detection, especially with respect to traffic sign recognition (TSR), has seen increased attention over the past few years. For example, object detection systems are currently being implemented in advanced driver assistance systems (ADAS). Conventional object detection methods usually involve two stages. First, in the detection stage, image regions that contain candidates of target objects are detected or localized. Then, in the recognition stage, such regions are further analyzed to recognize the specific content. However, these conventional object detection systems and methods generally require a large amount of computing resources, have slow detection speeds, and can be inaccurate at times.

SUMMARY OF THE INVENTION

In one embodiment, a method for detecting objects in a digital image. The method comprises receiving at least one image representing at least one frame of a video sequence of an external environment. A given color channel of the at least one image is extracted. At least one blob that stands out from a background of the given color channel that has been extracted is identified. One or more features are extracted from the at least one blob that has been identified. The one or more features that have been extracted are provided to a plurality of pre-learned object models each comprising a set of pre-defined features associated with a pre-defined blob type. The one or more features are compared to the set of pre-defined features of each pre-learned object model in response to the providing. The at least one blob is determined, in response to the comparing, to be of a type that substantially matches a pre-defined blob type associated with one of the pre-learned object models. At least a location of an object is visually indicated within the at least one image that corresponds to the at least one blob in response to the determining.

In another embodiment, an information processing system for detecting objects in a digital image is disclosed. The information processing system comprises a memory and a processor that is communicatively coupled to the memory. The information processing system also comprises an object detection system that is communicatively coupled to the memory and the processor. The object detection system is configured to perform a method. The method comprises receiving at least one image representing at least one frame of a video sequence of an external environment. A given color channel of the at least one image is extracted. At least one blob that stands out from a background of the given color channel that has been extracted is identified. One or more features are extracted from the at least one blob that has been identified. The one or more features that have been extracted are provided to a plurality of pre-learned object models each comprising a set of pre-defined features associated with a pre-defined blob type. The one or more features are compared to the set of pre-defined features of each pre-learned object model in response to the providing. The at least one blob is determined, in response to the comparing, to be of a type that substantially matches a pre-defined blob type associated with one of the pre-learned object models. At least a location of an object is visually indicated within the at least one image that corresponds to the at least one blob in response to the determining.

In yet another embodiment, a computer program product for detecting objects in a digital image is disclosed. The computer program product comprises a storage medium readable by a processing circuit and storing instructions for execution by the processing circuit for performing a method. The method comprises receiving at least one image representing at least one frame of a video sequence of an external environment. A given color channel of the at least one image is extracted. At least one blob that stands out from a background of the given color channel that has been extracted is identified. One or more features are extracted from the at least one blob that has been identified. The one or more features that have been extracted are provided to a plurality of pre-learned object models each comprising a set of pre-defined features associated with a pre-defined blob type. The one or more features are compared to the set of pre-defined features of each pre-learned object model in response to the providing. The at least one blob is determined, in response to the comparing, to be of a type that substantially matches a pre-defined blob type associated with one of the pre-learned object models. At least a location of an object is visually indicated within the at least one image that corresponds to the at least one blob in response to the determining.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 16 shows various examples of Haar features;

FIG. 17 shows various examples of Histogram of Oriented Gradients features;

FIG. 22 shows a table created after training classifiers based on Haar and HOG features according to one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Operating Environment

Figure 1:
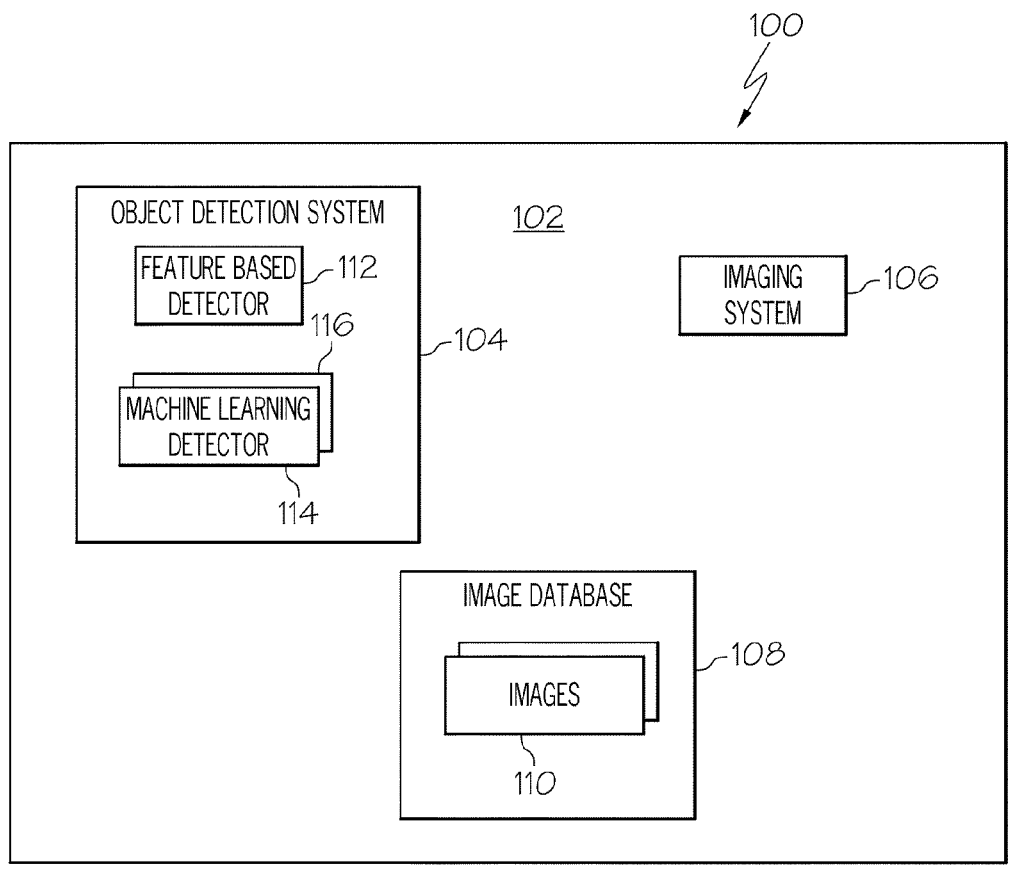
FIG. 1 is a block diagram illustrating a high level overview of a system for detecting objects in digital images according to one embodiment of the present invention.

According to one embodiment, FIG. 1 illustrates a general overview of one operating environment 100. In particular, FIG. 1 shows an information processing system 102 that can be implemented within a vehicle such as an automobile, motorcycle, and the like. Additionally, the system 102 can be communicatively coupled to a user assisted training environment for training purposes. The system 102 includes, among other things, an object detection system (ODS) 104, an imaging system 106, and an image database 108 comprising one or more images 110. The images 110, in one embodiment, represent frames of a video sequence of an external environment. The ODS 104, in one embodiment, comprises a feature-based detector 112 and/or one or more machine-learning-based detectors 114, 116. It should be noted that, in some embodiments, one or more of the above components reside outside of and are coupled to the information processing system 102.

The ODS 104, in one embodiment, operates in real time to automatically detect various objects of a given desired object type/class from frames/images 110 captured by the imaging system(s) 106. Throughout the following discussion, signs, such as traffic signs, are used as the object of interest (target objects) for the ODS 104. However, this is only one example of an object that is detectable by the ODS 104. Other examples of objects that are detectable by the ODS 104 include, but are not limited to, vehicles, headlights, pedestrians, animals, and/or the like. Sign detection is important, especially in advanced driver assistance systems (ADAS). For example, traffic signs are designed to not only regulate the traffic, but also indicate the state of the road. This helps guide and warn drivers and pedestrians when traveling on the road associated with the traffic signs. As will be shown in greater detail below, the ODS 104 can utilize a feature-based detector and/or a learning based detector that is able to detect or localize various types of traffic signs from real-time videos or still images.

Examples of traffic signs applicable to one or more embodiments of the present invention can include circular signs having a border of a certain color such as (but not limited to) red, triangular signs having a border of a certain color, and inverted triangular signs having a border of a certain color. It should be noted that although the following discussion utilizes traffic signs shown as the objects of interest for the ODS 104, one or more embodiments of the present invention are not limited to these specific traffic signs (or traffic signs in general).

Feature Based Detection

Figure 2:
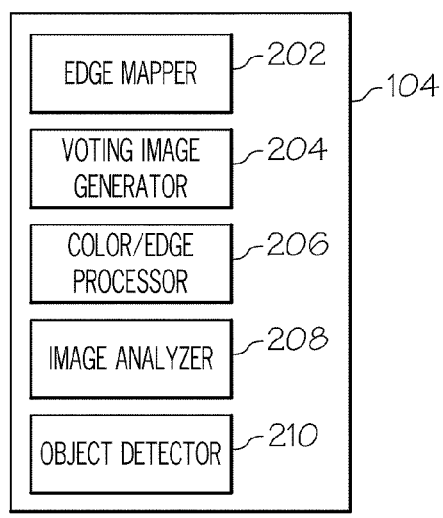
FIG. 2 is a block diagram illustrating a feature-based detector used by the system of FIG. 1 according to one example of the present invention.

FIG. 2 shows a more detailed view of the ODS 104. In the example shown in FIG. 2, the ODS 104 comprises a feature-based detector 112. The feature-based detector 112 comprises an edge mapper 202, a voting image generator 204, a color/ edge processor 206, an analyzer 208, and an object detector 210. The feature-based detector 112 utilizes these components to detect objects of interest within frames/images 110. In the following examples, feature-based detector 112 utilizes these components to detect signs based on their symmetric nature. A more detailed discussion of radial symmetry can be found in Loy, G., Zelinsky, A.: Fast radial symmetry for detecting points of interest: IEEE Transactions on Pattern Analysis and Machine Intelligence 25 (2003) 959-973, which is hereby incorporated by reference in its entirety.

One type of sign that the feature-based detector 112 can detect are circular signs. Circles are radially symmetric, therefore, for a given pixel p and its gradient $\vec{g}$, which is calculated using an edge operator that yields orientation, if p lays on the arc of a circle, then the center of the circle (denoted by c) would be in the direction of gradient $\vec{g}$ and at the distance of its radius (denoted by r). In one example, the gradient $\vec{g}(p)$ can point away from the circle center or towards the circle center. See, for example, Barnes, N., Zelinsky, A.: Real-time radial symmetry for speed sign detection: IEEE Intelligent Vehicles Symposium (2004), which is hereby incorporated by reference in its entirety.

Figure 3:
FIG. 3 shows one example of a frame/image comprising two circular traffic signs to be detected by the feature-based detector of FIG. 2 according to one example of the present invention.
Figure 4:
FIG. 4 shows one example of an edge map for the frame/image shown in FIG. 3 according to one example of the present invention.

Therefore, for a given frame/image 310 (FIG. 3) in the image database 108, the edge mapper 202 of the feature-based detector 112 generates an edge map 402 (FIG. 4) that identifies edges within the image 310. As can be seen in FIG. 3, the image 310 comprises two circular signs 302, 304. The edge mapper 202 can utilize various techniques to identify sharp discontinuities in the intensity profile of the image 310. The edge mapper 202 uses one or more edge detectors, which are operators that compute differences between pairs of neighboring pixels, to generate the edge map 402. High responses to these operators are identified as edge pixels. The edge map 402 can be computed in a single scan through the image 310. Examples of edge detectors are the Gradient- and Laplacian-type edge finders and edge operators such as Sobel. The edge map 402 of FIG. 4 was generated using the Sobel operator on the image 310 of FIG. 3.

Figure 5:
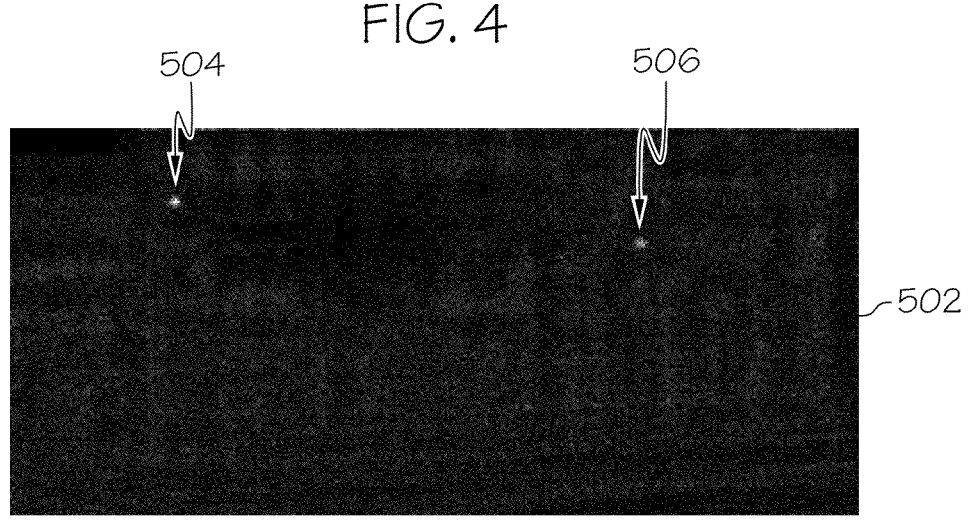
FIG. 5 shows one example of a voting image for the edge map of FIG. 4 according to one example of the present invention.

The analyzer 208 then analyzes the edge map 402 to estimate, for every edge pixel p in the edge map 402, the center of the circle that p possibly belongs to. One method for estimating this center is by casting a vote to the pixel p at a radius r along or against the direction of its gradient. The more votes that a pixel gets from other pixels, the more likely it is a true circle center. The voting image generator 204 then generates a voting image 502 (FIG. 5) based on the above estimation process. As can be seen from FIG. 5, pixels 504, 506 that surround the center of the two circular signs 302, 304 are much brighter than the others. The object detector 210 then analyzes the voting image 502 and identifies these brighter pixels 504, 506 and identifies the circular entities 302, 304 associated with these pixels as traffic signs.

Another type of sign that the feature-based detector 112 can detect are triangular signs. The feature-based detector 112 performs a process similar to that discussed above with respect to circular signs with additional knowledge about the pattern of the edge orientations. For example, assuming that a triangle inscribes upon a circle with r denoting the perpendicular distance from the centroid to the edge, the feature-based detector 112 performs sign detection based on the following two cues: 1) for each edge pixel p that lies on a triangle, its gradient points to a straight line that goes through the center and is at the distance of r. In other words, rather than gradient elements voting for a single point, a line of votes is cast describing possible shape centroid positions that account for the observed gradient element; and 2) triangular sign is equi-angular, which prompts the feature-based detector 112 to apply a rotationally invariant measure to check how well a set of edges fit a particular angular spacing. See, for example, Loy, G., Barnes, N.: Fast shape-based road sign detection for a driver assistance system: Proceedings of IEEE/RSJ International Conference on Intelligent Robots and Systems (2004) 70-75, which is hereby incorporated by reference in its entirety. The image pixels in the neighborhood of the triangle centroid stand out in the input image similar to the pixels 504, 506 in FIG. 5 for a circular sign.

The feature-based detector 112 also applies post-processing to reduce false positives by exploiting both color and edge information. For example, the color and edge processor 206 of the feature-based detector 112 checks if the gravity center of all color pixels of interest (e.g., red) within the bounding box of the candidate sign is close enough to its detected centroid. This ensures that all color pixels of interest, if not all on the edges, be symmetrically distributed within the bounding box. Moreover, the number of color pixels of interest should be within certain percentage range of the sign's size. Also, the color and edge processor 206 validates the triangle geometry by checking the angles formed by three edges. Specifically, the color and edge processor 206 performs color segmentation on the candidate image region, retaining only color pixels of interest. The color and edge processor 406 then splits the region into maps that contain pixels with 0°, 60° and 120° orientation, respectively.

Next, the color and edge processor 206 performs an interactive method such as, but not limited to, the Random Sample Consensus (RANSAC) procedure to fit a line on pixels in each map with the best effort. See, for example, Fischler, M., Bolles, R.: Random sample consensus: A paradigm for model fitting with applications to image analysis and automated cartography: Communication of the ACM 24 (1981) 381-395, which is hereby incorporated by reference in its entirety. The color and edge processor 406 then verifies the angles between these three lines, as well as checking the size of formed triangle.

For example, there are typically some pixels with the same direction of gradient in the corner opposite the line in each sub image. These corner pixels throw off a least squares regression. Therefore, RANSAC is applied to bypass them. The RANSAC procedure for 2D lines can be outlined as follows. First, two points are randomly selected and the line they define is calculated. Then the number of points in the image within some tolerance of that line is counted. If the number of points accounted for is above a given threshold the process continues. Otherwise, the first and second steps are repeated until the maximum iteration limit is reached or a suitable line is found. Then, a least squares process is used to find a new line with the points selected in the third step as input. One embodiment improves upon the above procedure by immediately rejecting lines calculated in the first step that have a slope outside of a given tolerance around the expected value for a 0°/60°/120° line. This prevents the algorithm from selecting candidate lines perpendicular to the real line, passing through the opposite corner. It should be noted that the above discussion is also applicable to other geometric shapes as well and not just circular and triangular shapes.

Once an object such as a traffic sign (e.g., circular or triangular), is detected by the object detector 410, the feature-based detector 112 can track it across the frames (e.g., across sequential images) so as to improve the processing speed. Nevertheless, to avoid tracking falsely detected objects, the feature-based detector 112 can implement a detect-by-tracking strategy. For example, the feature-based detector 112 can first track the search area for a previously-detected traffic sign, and then confirm its exact location by performing the detection within the search area.

In more detail, objects are tracked based on the tracking information obtained from the previous frame, so that the ODS 104 can quickly adapt to the changing driving situation (e.g. changing driving direction, changing speed, etc.). For example, assume that an object A has been detected at frame f. Tracking this object to frame f+1 involves the following two sub-tasks: 1) identifying a search area S in frame f+1 for localizing object A and 2) actually localizing object A within area S.

Figure 6:
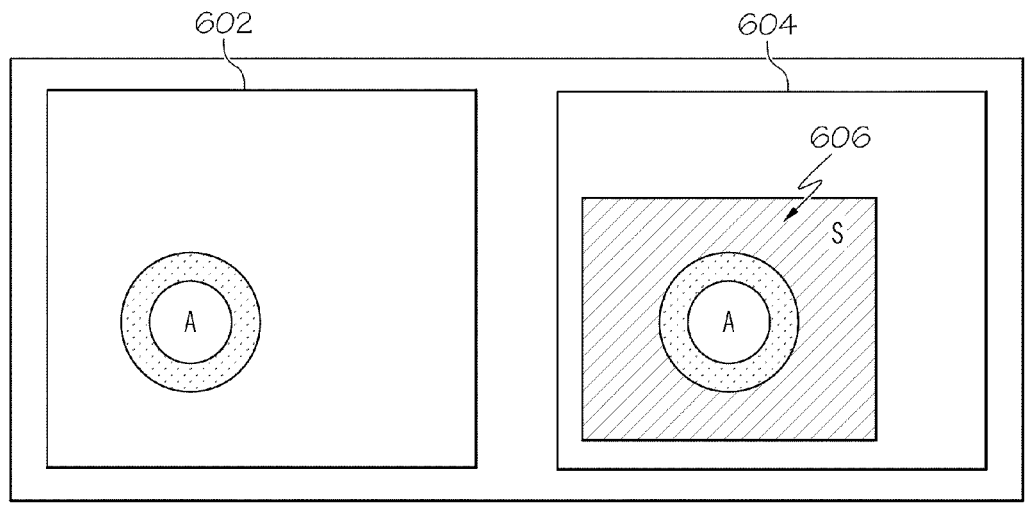
FIG. 6 shows one example of identifying a search area within a frame/image according to one example of the present invention.

To accomplish the first sub-task, the size of the search area S is determined based on the size and moving direction of object A detected in the previous frame. For example, if A is detected in frame f 602 (FIG. 6) for the first time, then due to the lack of moving information, S is set to be a larger area centering on object A in frame f+1 604. In FIG. 6, the area 606 denoted by the diagonal pattern denotes the search area S for object A.

Figure 7:
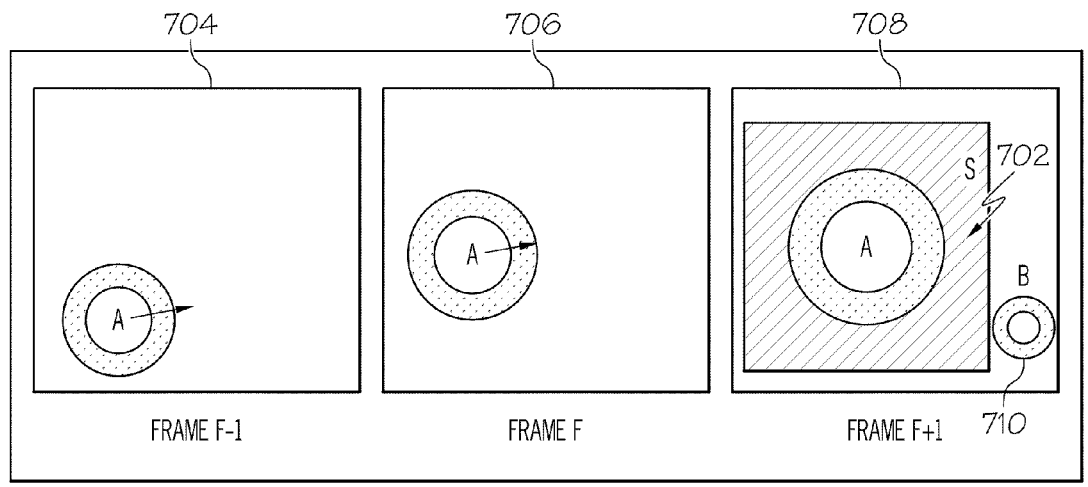
FIG. 7 shows one example of tracking objects between frames and detecting emerging objects in a frame according to one example of the present invention.

Otherwise, if object A was also previously detected in frame f−1, then A's moving information (i.e. displacement in both x and y directions) from the frame pair f−1 and f is obtained. This moving information is used to derive the possible position for object A in frame f+1. For example, as shown in FIG. 7, the center of area S 702 in frame f+1 708 is calculated from the center of A in frame f 706 based on object A's moving information derived from frame f−1 704 to f 706. As for the size of S 702, it is derived based on the following two factors: 1) the size change of object A from frame f−1 704 to f 706; and 2) the size of object A in frame f 706. If object A has a large size, meaning that it is close to the host car, then it tends to change more in terms of its size for the subsequent frames. In contrast, if object A is small, meaning that it is far away from the host car, then object A's size change would be small or even unnoticeable for the subsequent few frames.

To fulfill the second sub-task, i.e., to actually localize the object within search area S, the following is performed. Once the search area S 702 is detected, the same object detection process is carried out, as discussed above, to locate the object within S 702. Compared to performing the detection over the entire image, by constraining the detection within a small search area, the performance of the process increases.

In addition to the above, one or more embodiments perform a partial scan for detecting emerging objects. Using frame f+1 708 shown in FIG. 7 as an example, if target objects are only searched for within area S 702, object B that just appears in frame f+1 708 (or when object B 710 becomes large enough to be detected) one or more embodiments are able to detect this emerging object. For example, one embodiment searches the rest of area in the frame. However, the benefit of restricting the search within a relatively small area is then lost.

Figure 8:
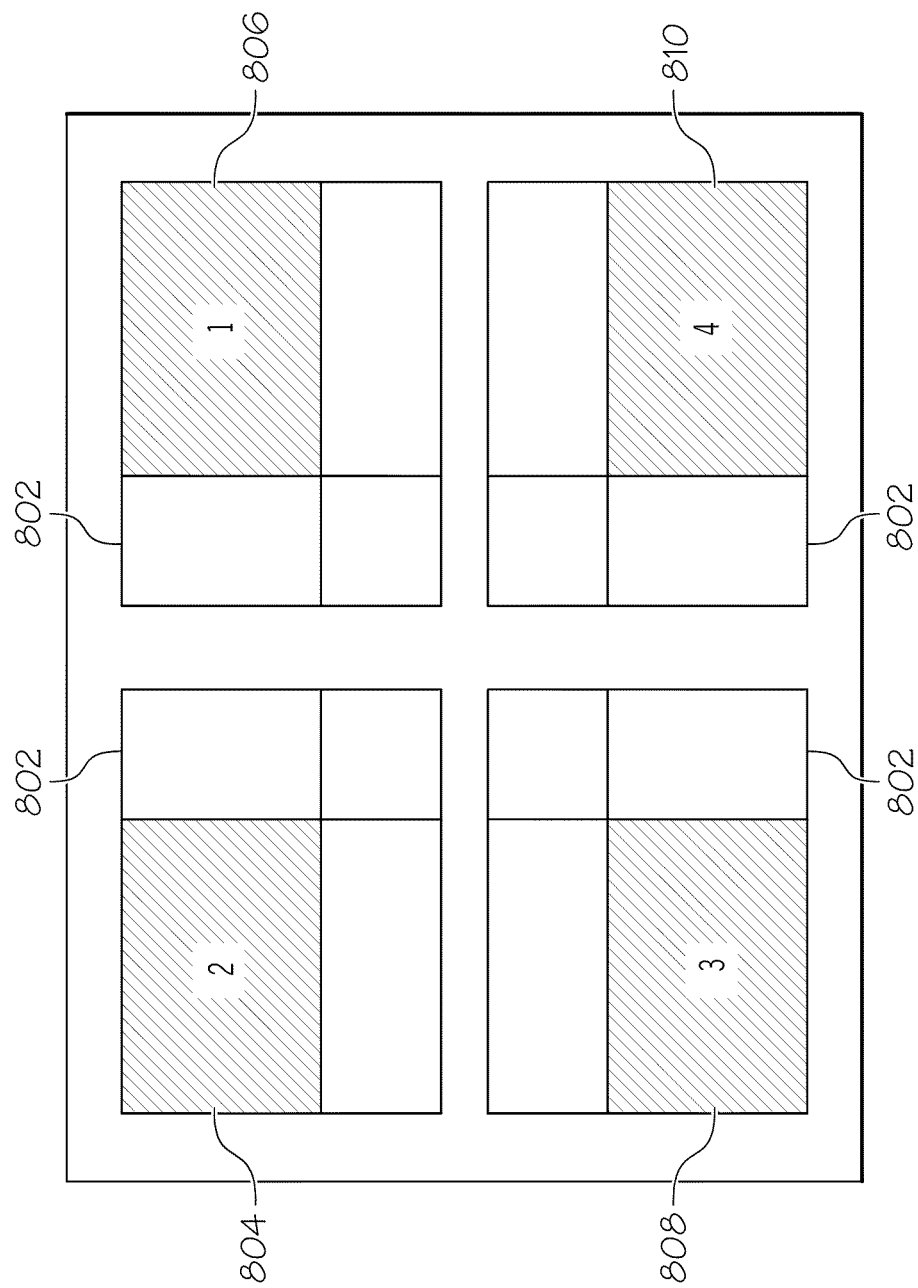
FIG. 8 illustrating one example of partial regions of an image/frame for detecting emerging objects according to one example of the present invention.

In another embodiment, a pre-defined portion 804, 806, 808, 810 within each frame 802 is searched, in addition to the area S 702, as shown in FIG. 8. For example, a frame 802 is divided into four quadrants 804, 806, 808, 810, with each quadrant b sequentially searched in every four frames. Therefore, at any frame, only ¼ of its size is being searched for, plus the identified search area S 702 if an object is previously detected. In this case, any emerging object will be eventually detected and then delayed at most by 3 frames. In one embodiment, considering that an object may lay on the boundary of two quadrants, some overlap is allowed, which is set to be the minimum radius r for searching the target traffic signs, between every two quadrants. To further speed up without sacrificing the performance, the range of object size to be searched in this case could be set to small.

Machine Learning Based Detection

Figure 9:
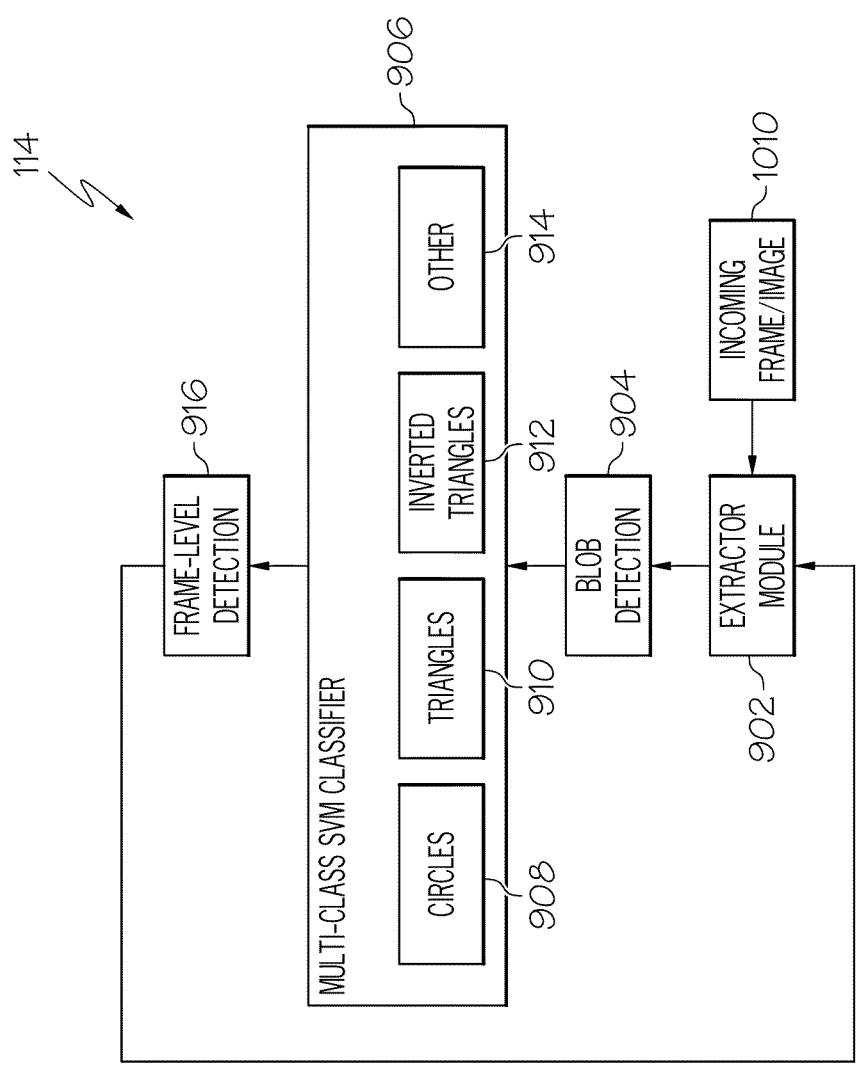
FIG. 9 shows one example of an SVM-based detector used by the system of FIG. 1 according to one example of the present invention.
Figure 11:
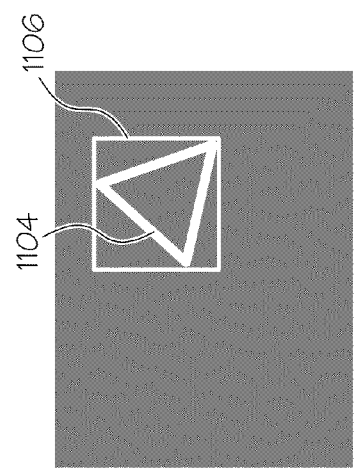
FIG. 11 shows one example of a blob that has been detected in the frame/image of FIG. 10 according to one example of the present invention.
Figure 10:
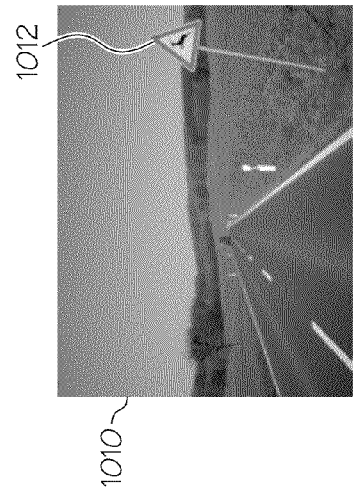
FIG. 10 shows one example of a frame/image comprising a traffic sign to be detected by the SVM-based detector of FIG. 9 according to one example of the present invention.

As discussed above, the ODS 104 can also include one or more machine-learning-based detectors 114, 116. For example, in one embodiment, the ODS 104 comprises a Support Vector Machine (SVM)-based detector 114. FIG. 9 shows one example of the SVM-based detector 114. In particular, FIG. 9 shows that the SVM-based detector 114 comprises a multi-level detection framework. Specifically, the first level includes an extractor module 902 that receives an incoming frame/image 1010 and extracts a binarized color channel of the frame/image 1010. FIG. 10 shows one example of a frame/image 1010 that comprises a rectangular sign 1002. The second level includes a blob detection module 904, which performs connected component analysis on the extracted binarized color channel to obtain a list of blobs. FIG. 11 shows the binarized color channel 1102 of the image 1010 in FIG. 10 where the detected blob 1104 is bounded by a white rectangle 1106.

The third level includes one or more binary classifiers or a multi-class SVM (Support Vector Machine) classifier 906 each applying an SVM learning approach to recognize different image blobs, which include candidates of circles 908, triangles 910, inverted triangles 912, and optional other objects 914. Note that the optional other object category 914 mainly includes those elements such as other geometric shapes known to not be associated with the objects types not being monitored for. In an embodiment that utilizes one or more binary classifiers, there is a pre-trained classifier for each object type to be detected. For example, in one embodiment there is a pre-trained classifier that recognizes circles, a pre-trained classifier that recognizes triangles, and a pre-trained classifier that recognizes inverted triangles. These pre-trained classifiers can also be referred to pre-trained object models each comprising a set of pre-defined features associated with a pre-defined blob type. It should be noted that the following discussion with respect to a multi-class classifier also applies to the separate pre-trained classifiers Finally, in the fourth level a frame-level detection process 916 is carried out to determine if a detected blob for the current frame/image is an object of interest, such as a sign, based on at least the SVM classification result.

The following is a more detailed discussion on the extractor module 902 of the SVM-based detector 114. In the current example, the SVM-based detector 114 is targeting traffic signs that all have enclosed borders of a given color, such as red. As a result, these signs can be treated as blobs in the red channel of the image, and be classified accordingly. Therefore, the extractor module 902 receives an incoming frame I, such as the frame/image 1010 shown in FIG. 10, and extracts its binarized red channel $I^R$. Specifically, the extractor module 2002 first converts I from the original Red, Green, Blue (RGB) space into Hue, Saturation, Insensity (HIS) space. Then, for each pixel that appears to be red, the extractor module 902 sets its values, for example, to 255 in $I^R$; otherwise, 0. Here, a color is defined to be red if its hue is between 0 and 30, or 330 and 360, and its saturation is larger than 45. However, other values can be applied as well.

With respect to the blob detection module 904 of the SVM-based detector 114, this module 904 applies a standard connected component analysis to identify spots in an image 1010 of a given color, such as red in this example. For example, the blob detection module 904 performs a connected component analysis on $I^R$ to obtain a list of blobs. These blobs are then passed onto the SVM classifier layer 906 for type recognition. Note that by applying such spatial attention function at this level of the ODS 104, a substantial computational effort can be saved from running the classification engine at all possible positions, scales, or orientations within the image. The frame-level object detection layer 916 then detects objects of interest based on the blob classification in the SVM classifier layer 906 and presents detected objects of interest to a user accordingly. For example, FIG. 11 shows one example of visually indicating a location of a detected object of interest, such as the blob 1104 representing the triangular sign 1102 in frame/image 1010 of FIG. 10, by surrounding the blob 1104 with a bounding box 1106.

The following is a more detailed discussion on the multi-class SVM classifier 906. Two phases are involved in this module 906: SVM training and SVM classification. In one embodiment, the training phase produces a multi-class SVM model, which has learned the following three different types of blobs: circle 908, triangle 910, and inverted triangle 912. Optionally, a fourth type of blob, other 914 (anything other than a target object), can be learned as well. The classification phase then uses such model to recognize the type for an unknown blob.

Figure 12:
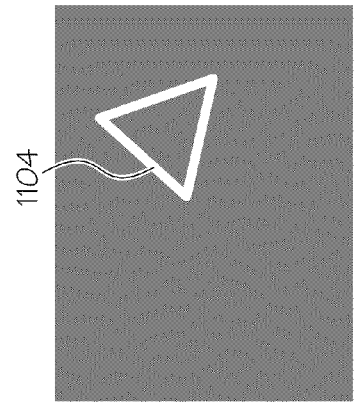
FIG. 12 shows that the orientation of the blob in FIG. 11 has been adjusted according to one example of the present invention.
Figure 13:
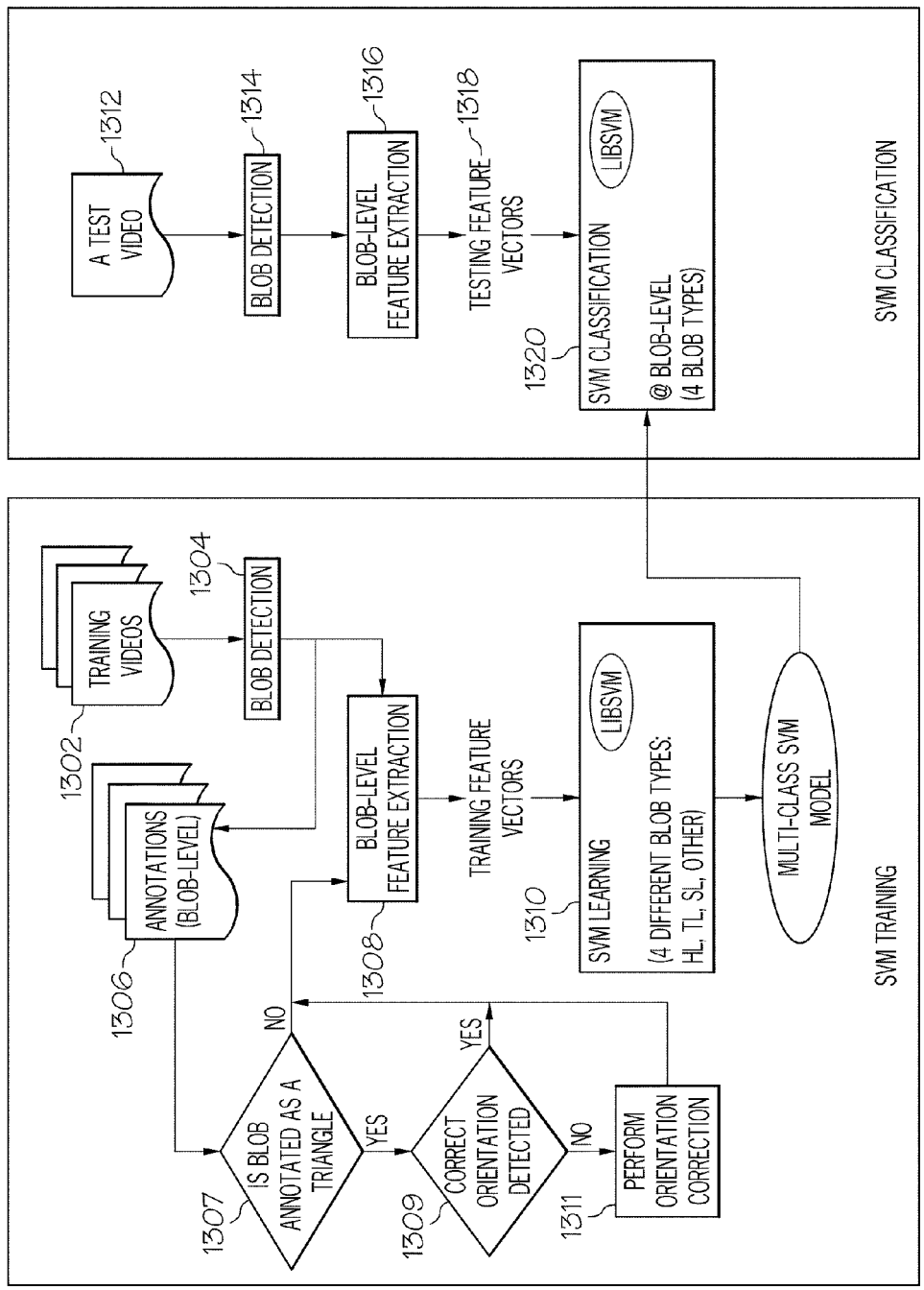
FIG. 13 is an operational flow chart illustrating SVM-based detector training and classification according to one embodiment of the present invention.

FIG. 13 illustrates a flowchart for the above two processes. Specifically, during the training phase, a set of images 110, at step 1302, is identified that include representative data in terms of target objects. Qualified blobs, at step 1304, are then detected within each frame and matched with the ground truth (e.g., human annotations of the target objects in frames/images) in terms of their spatial locations. The types of the detected blobs are manually annotated, at step 1306. If the blob, at step 1307, is determined to be annotated as a triangle, the relative positioning of its left and right vertices, at step 1309, are examined, to verify that it has the right orientation. If not, necessary operations, at step 1311, are performed to rotate it back to its right position. For example, FIG. 11 shows that the triangular sign is slightly tilted to the right. Therefore, to correct this tilt, the blob is rotated around its right vertex and the upright version shown in FIG. 12 is obtained.

A list of features, at step 1308, is extracted from each detected blob. Such feature vectors (plus the proper class labels) are then used as training samples for SVM learning at step 1310. In one embodiment, the LibSVM tool (see, for example, P. Chen, C. Lin, and B. Scholkopf, "A tutorial on v-support vector machines", Applied Stochastic Models in Business and Industry, 21:111-136, 2005. which is hereby incorporated by reference in its entirety), can be used with the kernel chosen to be Radial Basis Function (RBF).

During the classification phase, given a test video 1312, blob detection and feature extraction, as discussed above, are performed, at steps 1314 and 1316, respectively, to form testing feature vectors, at step 1318. Then the SVM classifier 906 such as the LibSVM tool, at step 2420, recognizes each blob type using the pre-trained SVM model.

Figure 14:
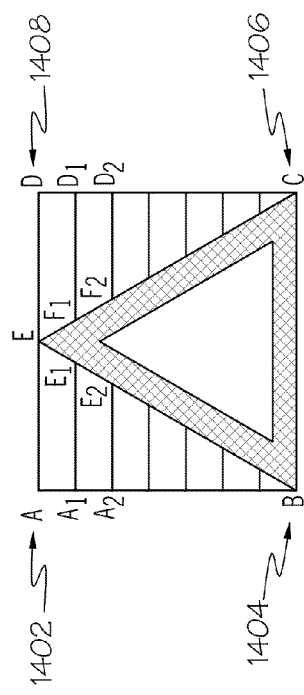
FIG. 14 shows one example of SVM-based feature extracting according to one embodiment of the present invention.

With respect to feature extraction, a total of forty features are extracted from each blob, which aim to capture both of its geometric and symmetric characteristics. For example, observing that the target traffic signs all have regular shapes, and are horizontally symmetric, the first twenty features are used to capture its left-side shape, and use the second twenty features to reveal its symmetry. For simplicity, the four vertices 1402, 1404, 1406, 1408 of a blob's bounding box are denoted A, B, C and D as shown in FIG. 14. The first twenty features are extracted as the twenty equally sampled distances from its left edge (i.e. AB) to the blob. FIG. 14 illustrates the first three distances $|AE|$, $|A_1E_1|$ and $|A_2E_2|$.

The same process is repeated by measuring the distances from the right edge (i.e. CD) to the blob, and obtain another set of twenty distances. The absolute difference is then taken between every two distances that sit on the same horizontal line, but represent the distances from the left and right, respectively. In example of FIG. 14, the first three differential distances are $\||AE|-|DE|\|$, $\||A_1E_1|-|D_1F_1|\|$, and $\||A_2E_2|-|D_2F_2|\|$. The set of such differential distances then form the second twenty features.

Figure 24:
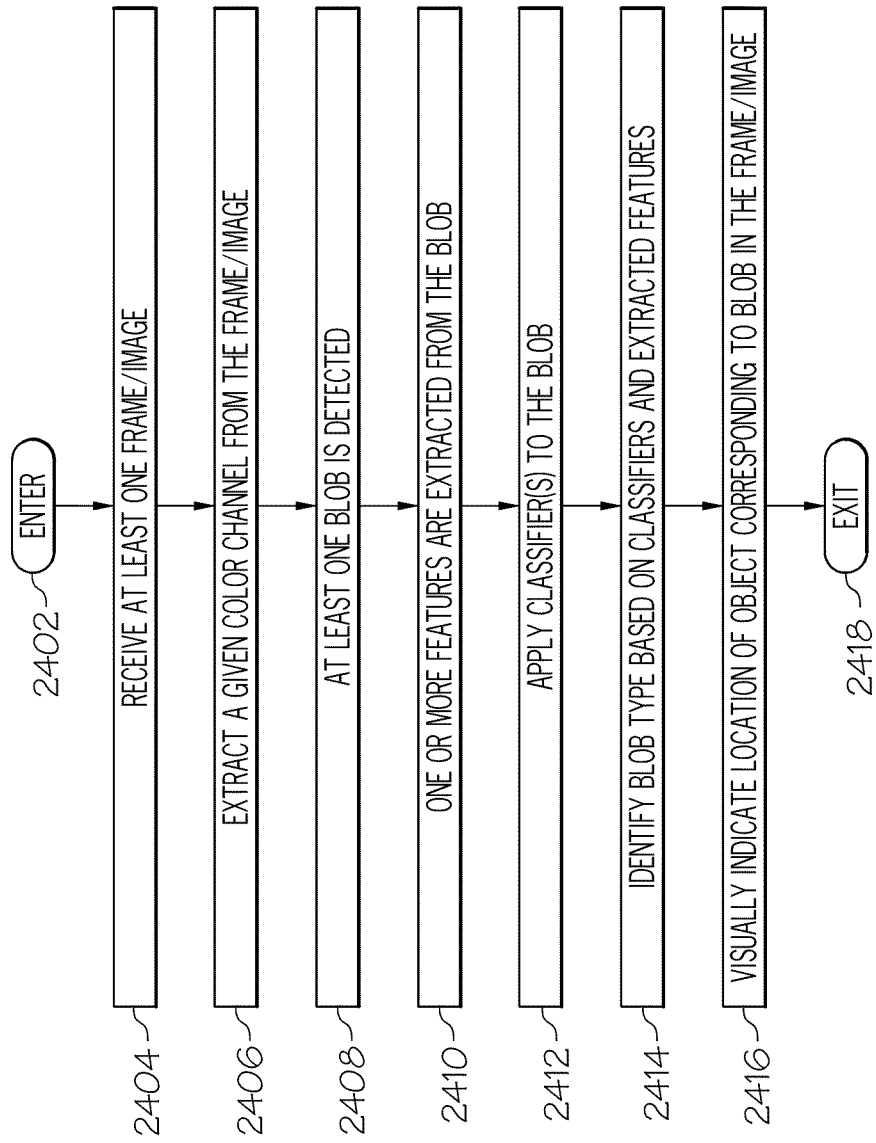
FIG. 24 is an operational flow diagram illustrating one process for detecting objects in a digital image using the SVM-based detector of FIG. 9 according to one embodiment of the present invention.

FIG. 24 is an operational flow diagram illustrating one process for detecting an object of interest, such as a traffic sign using the SVM-based detector 114. The operational flow diagram begins at step 2402 and flows directly to step 2409. A frame/image 110, at step 2404, is received by the SVM-based detector 114. The red channel $I^R$, at step 2406, is extracted for the incoming frame/image 110. One or more blobs, at step 2408, are detected in the extracted color channel, as discussed above. Moreover, observing that some traffic signs are failed to be detected due to their broken edges in $I^R$, another set of blobs are detected from its morphologically dilated image. The two sets of blobs are then merged together and redundant blobs are removed.

Figure 15:
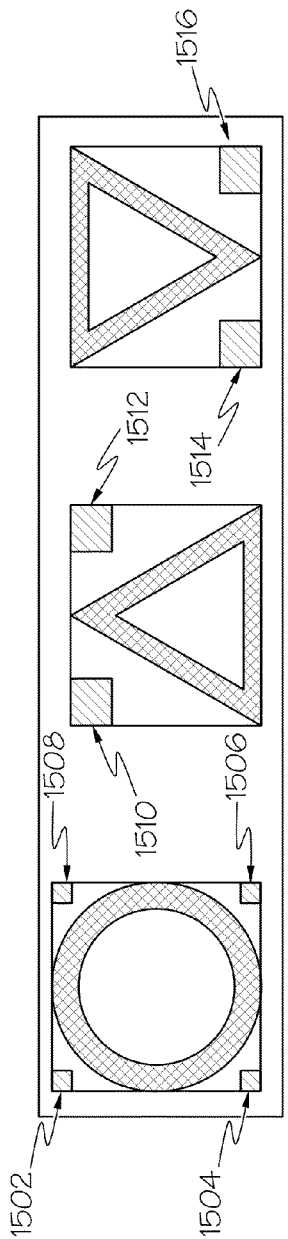
FIG. 15 shows various examples of regions within a bounding box used to determine the shape of a detected blob according to one embodiment of the present invention.

Each blob in the merged set of blobs is then analyzed to determine if the rough shape (or approximate shape) of the blob is potentially an object of circular, triangular, or inverted triangular shape. If not, the blob is removed from further processing. For example, this rough shape analysis is performed by examining if certain areas within the blob's bounding box only contain background. For instance, if the rough shape of the blob is a circular object, then the four small corners 1502, 1504, 1506, 1508 areas as shown in FIG. 15 should not contain any pixels from the object. Areas 1510, 1512, 1514, 1516 are used for checking triangular objects. This process is advantageous because it distinguishes triangular objects from others, speeds up the process, and helps reduce false alarms.

When a blob is determined to possibly be of a triangular shape, the orientation process discussed above is performed. Feature extraction, at step 2410, is performed to form a test sample. The pre-trained SVM multi-classifier (to detect circle, triangle, and inverted triangle), at step 2412, is then applied to each test sample. As discussed above, individual pre-trained classifiers can also be applied instead of a multi-class classifier to detect each target object type. The class that has the highest probability is then returned, at step 2414. The SVM-based detector, at step 2416, visually indicates the location of the detected object (e.g., traffic sign) corresponding to the blob in the frame/image 110. For example, a bounding box similar to that shown in FIG. 11 can be displayed around the sign 2102 in FIG. 21. The control flow then exits at step 2418.

In one or more embodiments, a tracking approach is applied to maintain a consistent detection and improve performance. For example, for any blob B in the current frame, if the blob's classification probability from the multi-classifier (or individual classifiers) is lower than a given threshold such as 0.5 (i.e. if a confident classification is not able to be made) an attempt to match this blob with blobs in the preceding frame is made. If a good match is found (e.g., $B^p$), meaning that they correspond to the same traffic sign, B is assigned to the same class as $B^p$. The object tracking and partial scanning processes discussed above with respect to the feature-based detector 112 are also applicable to the SVM-based detector 114 as well.

In addition to the SVM-based detector 114 discussed above, the ODS 104 can also comprise a boosted-cascade detector 116. In this embodiment, the boosted-cascade detector 116 utilizes an Adaptive Boost (AdaBoost) based framework that is extended to include both (or at least one of) Haar and HOG (Histograms of Oriented Gradients) features. For example, as will be discussed in greater detail below, a cascade of classifiers are trained using both Haar features and HOG based weak classifiers in a discriminative fashion. Also, the feature selection process is decoupled from the ensemble classifier design to form an ensemble classifier. This permits scalable training of strong classifiers to require significantly less compute power and also achieves desired performance with a smaller number of features.

The boosted-cascade detector 116 utilizes the AdaBoost-based framework to classify an image patch into either an "object" or a "non-object". More specifically, the AdaBoost-based framework is applied to select (and weight) a set of weak classifiers, some of which, may be based on Haar wavelet features. These features consider adjacent rectangular regions at a particular location in a window and sum up the pixel intensities in these regions. The differences between these regions are then calculated in order to categorize subsections of a frame/image These wavelet features can be applied to patches of gray-scale images, and parameterized by their geometric properties such as position, width and height. In one embodiment, five Haar wavelets are used. These wavelets are two edge detectors (rectangle pairs), horizontal and vertical; two bar detectors (rectangle triples), horizontal and vertical, and one center-surround detector (rectangle within rectangle). FIG. 16 shows the above Haar features. For example, FIG. 16 shows the horizontal and vertical edge detector features 1602, 1604, the horizontal and vertical bar detector features 1606, 1608, and the center surround feature 1610. Pixels below the white areas are weighted by +1, and −1 for the black areas. A more detailed discussion on the AdaBoost framework is given in Viola, P., Jones, M.: Robust real-time object detection: Technical Report CRL 2001/01, Cambridge Research Laboratory (2001), which is hereby incorporated by reference in its entirety.

In addition to Haar features, the weak classifiers are also trained on HOG features with respect to the horizontal, vertical, and diagonal directions. HOG features can be used to count occurrences of gradient orientation in localized portions of a frame/image. FIG. 17 shows the HOG features discussed above. FIG. 17 shows how to calculate a horizontal Hog feature 1702, a first diagonal HOG feature 1704, a vertical HOG feature 1706, and a second diagonal HOG feature 1708. For example, the first HOG 1702 shown is designed to capture the gradient strength along the approximate horizontal direction. A more detailed discussion on HOG is given in Dalal, N., Triggs, B.: Histograms of oriented gradients for human detection: CVPR (2005), which is hereby incorporated by reference in its entirety.

In FIGS. 16 and 17, each outer rectangle 1612, 17010 indicates an image patch and the sub-region 1614, 1712 (w×h) within it indicates the position for feature computation. Note that during AdaBoost training, for each image patch, all possible sizes and positions of such sub-regions are enumerated and the optimal one is learned. During the training process, a cascade classifier is trained which contains a cascade of rejectors. At each layer of this classifier, the cascade-boosted based detector 116 uses an AdaBoost process to train an ensemble classifier based on a set of weak classifiers. At the end of the training process, as similar to the SVM-based detector 114 discussed above, one or more cascade classifiers will be trained for objects of interest. For example, if traffic signs are objects of interest, a classifier for circles, a classifier for triangles, and a classifier for inverted triangles will be trained. However, it should be noted that for other applications, other classifiers will be trained, such as classifiers for detecting vehicles, pedestrians, animals, headlights, and/or the like.

During the classification (recognition/localization) process, given an image frame which may be in color, the frame is first converted to monochrome (gray-scale) and subsequently scanned with a sliding window of different sizes at different locations. The image patch within each window is then extracted and classified. More specifically, the cascade-boosted based detector 116 starts the window size at an initial size (e.g., 24×24); then for each subsequent round of scanning, the size is increased by a constant percentage (e.g. 25%). Nevertheless, each windowed patch is ultimately scaled to the initial size (24×24), and variance-normalized before the feature calculation, to minimize the effect of illumination change. As it is very likely that a sign is detected in multiple overlapping windows at various scales, a fusion mechanism is finally applied to localize it with a single size and place.

Figure 18:
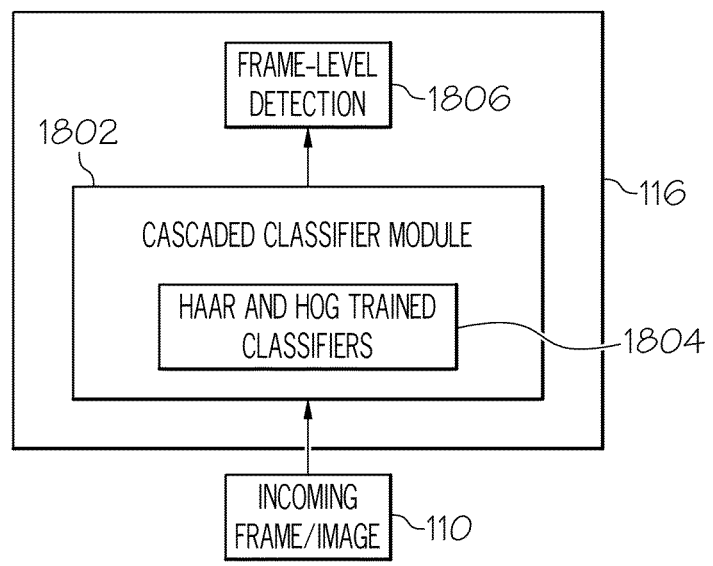
FIG. 18 shows one example of a cascade-boosted detector used by the system of FIG. 1 according to one embodiment of the present invention.

FIG. 18 shows one example of the cascade-boosted detector 116. In particular, FIG. 18 shows that the cascade-boosted detector 116 comprises a multi-level detection framework. Cascaded classification module 1802 receives an incoming frame/image 110. 1802 includes a set of classifiers 1804 that have been trained on Haar and HOG features to identify objects of interest within the incoming frame/image 110. For example, the cascaded classification module 1802 utilizes a sliding-window search scheme where windows of various scales are slid across the frame/image 110. The rectangular image patch underneath the sliding window is checked by one or more weak classifiers from the set of classifiers 1804 as the sliding window moves across the frame/image 110 to distinguish target object from non-target object patches based on the Haar and/or HOG feature(s) for which the classifier has been trained.

For example, the sliding window is a rectangle of a certain aspect ratio (for instance, 1:1 or 4:3). Wherever the window is placed and whatever size it is, the window can be rescaled (normalized) to a constant size (such as 50×50, or 160×120). Relative to this standard size, each Haar and/or HOG weak classifier in the set of classifiers 1804 references a rectangle within it. Each weak classifier specifies that some particular kind of calculation is made on the values of the pixels in that rectangle, and the result is a single number (a "scalar"). The type of calculation depends of the type of Haar or HOG feature being searched for, as has already been explained in the discussions of FIGS. 16 and 17. The weak classifier also specifies a threshold, and an inequality sense (which is either "less than or equal to" or "greater than"). The result of the calculation is compared to the threshold, and checked to see if the specified sense holds. If the sense holds, this is evidence that the sliding window contains an instance of the target/desired object class. If the sense does not hold, this is evidence that the sliding window does not contain an instance of the target/desired object class (e.g., a circle class, a triangle class, and an inverted triangle class, in the case of sign detection). A real instance of the object class usually triggers multiple detections around it, which overlap with each other; these are merged into a single detection in a later layer. There may also be some false detections, which are usually separate from one another, and can be removed at higher level of decision making.

Figure 19:
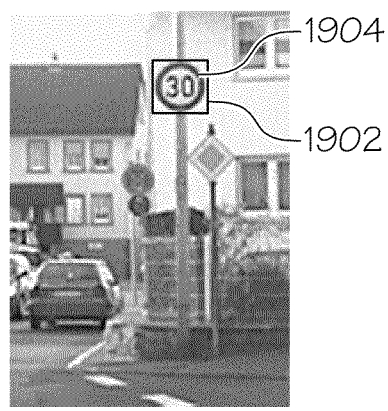
FIG. 19 shows one example of a frame/image comprising a circular traffic sign detected by the cascade-boosted detector of FIG. 18 according to one embodiment of the present invention.

In applications in which at most only one instance of the desired object class can be present in the image frame, or at most only one instance (the most prominent, or the most important, for instance), frame-level object detection layer 1806 of the cascade-boosted detector 116 can be included, which can then present a detected object of interest to a user by calculating a bounding box 1902 for the detected object 1904, as shown in FIG. 19. (Traffic signs are used in this figure only as examples, for the sake of explanation.)

Figure 20:
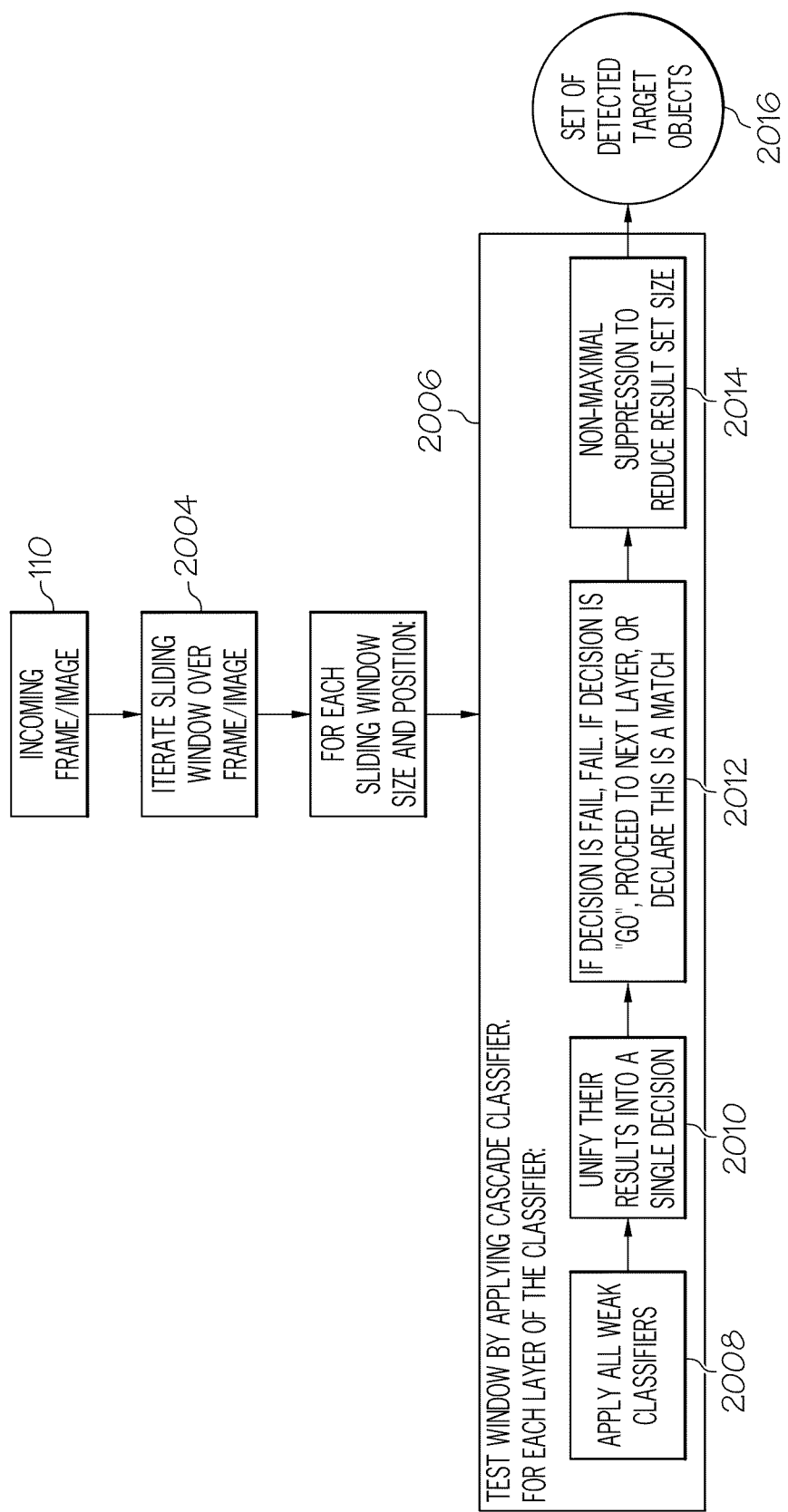
FIG. 20 is an operational flow diagram illustrating one example of a process for detecting objects in a digital image using the cascade-boosted detector of FIG. 18 according to one embodiment of the present invention.

FIG. 20 illustrates a flowchart for the above detection process performed by the detector 116. Incoming frame/image 110 is received by the cascaded classification module 1802. A sliding window, at step 2004, is iteratively applied over the frame/image 110. For each sliding window position and size the window, at step 2006, is tested by applying one or more weak classifiers from the set of weak classifiers 1804 that have been trained on Haar and HOG features, according to the cascade layering architecture which will now be discussed.

For each layer of the cascade classifier (module), the following is performed. All weak classifiers of that layer, at step 2008, are applied to the window. (There are some AdaBoost architectures where only selected weak classifiers are applied in a decision tree-like manner.) The decisions from all of the weak classifiers as to whether a target object has been detected or not detected are unified into a single decision, at step 2010. In step 2012, if a target object has not been detected, process 2006 exits, but if a target object has been detected by all layers up to and including the current one, the process determines if there is another layer. If there is another layer, the process returns to step 2008. If there is not another layer, the sliding window position is declared finally to be an instance of the desired object class, and is added to the result set. A non-maximal suppression operation, at step 2014, is performed to reduce the result set size by eliminating highly-overlapping window positions. The remaining set of zero or more detected target objects 2016 is output.

As discussed above, the set of weak classifiers 1804 used to build cascaded classifier 1802 have been trained, based on Haar and HOG features. The following explains how this training is performed. The performance (measured by detection rate (DR) and false acceptance rate (FAR)) of the detector 116 in FIG. 1 (also referred to as the Cascaded classifier 1802 in FIG. 18) depends on the performance of the set of selected weak classifiers 1804. In addition, the number of sub-images needed to be evaluated per frame against a classifier is very large (approximately a million sub-images for a frame size of 640×480). Therefore, a classifier needs to be run over a frame at extremely high speed (e.g., 24 fps) for a real-time application. Therefore, one or more embodiments train a cascade of classifier layers, each layer composed of steps 2008/2010/2012 in FIG. 20, of various complexity.

Figure 21:
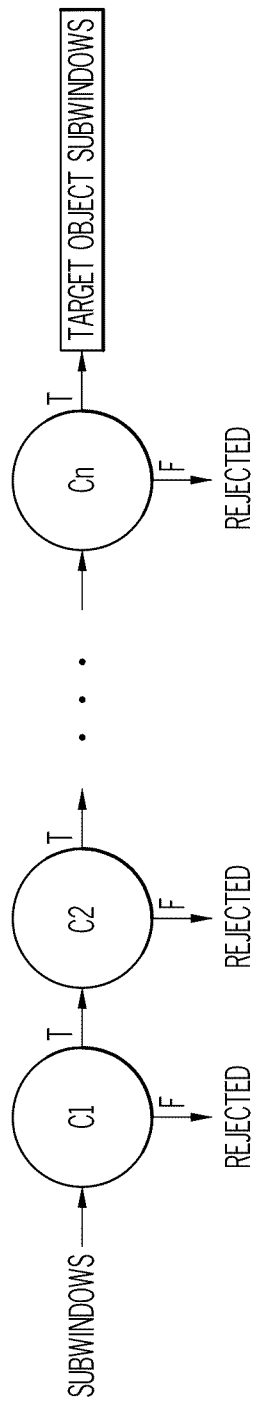
FIG. 21 illustrates one example of a cascaded classifier according to one embodiment of the present invention.

To train an AdaBoost classifier with a desired detection rate (DR) and false accept rate (FAR), a positive sample set (target object image patches) and a negative sample set (non-target object image patches) are used. To achieve a desired performance at high detection speed, one embodiment trains a series of classifiers, each of which is trained to have very high DR and moderate FAR. For example, in one embodiment, each cascade is trained to achieve a FAR of approximately 50% in each layer, with n total layers, where $n=\log 2(F)$; F is the desired false positive rate: $1\times10^{-6}$. A sub-image that is rejected at a certain layer of the cascade is rejected forever without the need for further tests, as shown in FIG. 21. In this way, a good percentage of non-vehicle sub-images are rejected in the first few layers where relatively simple classifiers are evaluated. Consider the fact that most of the sub-images are negatives. This strategy saves a lot of time.

The positive training samples for each layer can be the same, or substantially the same, for all layers, and are supplied by annotated samples. Negative samples are produced automatically, on the fly for each classifier layer, by randomly cropping from annotated videos, but avoiding overlapping with regions annotated as target objects by, for example, 40% or more. A qualified negative sample for a classifier for training layer must have been accepted by all previously trained classifier layers. To extract a negative sample set from the collection for training the first layer, sub-images of different sizes are selected from randomly-chosen frames from the video collection, where the sample's position (as defined, for example, by its center) within the frame is also randomly chosen, subject to sample size (the sample has to lie completely within the video frame), and its size is chosen from a random distribution which is shaped to choose more small sizes than large, to correspond to the fact that real world objects (like traffic signs, for example) are more likely to be distant from the camera than near to it. (The exact shaping of the distribution will be application-dependent, as some applications are 2-D; some are 3-D but impose constraints on object location, etc.)

The features used for learning are the five Haar and four HOG features discussed above with respect to FIGS. 16 and 17. The same rectangular regions generated for the Haar features are also used for the HOG features; in other words, a common rectangle-generator is used for both. This rectangle-generator can, for instance, generate (propose) rectangles of dimensions 2×2, 2×3, 2×4, ..., 3×2, 3×3, 3×4, ..., up to a maximum size, which is the size of the normalized window Weak classifier rectangle placement: once the rectangle dimensions are set, the rectangle-generator first proposes placing the rectangle so that it is aligned with, a given region, such as the upper left-hand corner, of the normalized window. Then, rectangle-generator proposes placing the rectangle one position to the right, and then two positions to the right, etc, until the rectangle no longer fits inside the right end of the normalized window. The rectangle-generator then proposes placing the rectangle at the left end of the second row in the normalized image, and so on, until the bottom of the normalized window is reached. In the end, all valid positions are proposed.

For each proposal of a rectangle size and rectangle placement, each of the HOG and Haar features are evaluated to produce the scalar value for each of the training instances. The four HOG features are computed together, as follows, although they can be selected for use individually. Over each rectangle generated by the above procedure, the relative strengths of intensity gradients of the four orientations horizontal, vertical, and the two principle diagonals (See FIG. 17) are computed, and normalized so that the sum of the strengths is 1. For the vertically-oriented gradient, for instance, for every pair of pixels in the rectangle that are vertically adjacent (one above the other, corresponding to 1706 in FIG. 17), the gray level (brightness) of the lower pixel is subtracted from the gray level of the upper pixel, and these differences are summed over all such pixel pairs in the rectangle. The absolute value of the sum is taken. Similarly for the other orientations. These are normalized by dividing all sums by the sum of the four sums. So if the horizontal, vertical, slash diagonal and backslash diagonal sums were 10, 20, 0, and 10, they would normalize to 0.25, 0.5, 0, and 0.25. So, the value of the first HOG feature would be 0.25, of the second, 0.5, and so on. Although there are four HOG features, only three of them are actually independent Once each of the HOG and Haar features are evaluated, the optimal threshold and the optimal inequality sense are calculated for each training instance. The term "optimal" means that, ideally, for all the positive training instances, their scalar value stands in the specified inequality relation to their threshold, and for all the negative training instances, the scalar value stands in the opposite relation to the threshold. Typically, this ideal condition is not met, so the AdaBoost process, in one embodiment, selects, at each cycle of selecting the best next weak classifier, the one feature that comes closest to being optimal. This feature can either be a Haar or HOG feature. In other words, the one feature (for the current rectangle), is selected that is most informative about discriminating between the positive and negative examples without regard to which kind of feature it is.

Weak classifiers are collected by this method until a number of them together give the correct decision over the training set a high enough percent of the time that the layer performance requirements have been met. In other words, the positive examples are labeled positive sufficiently often (the DR) and the negative examples are labeled positive sufficiently infrequently (the FAR). When these two conditions are met, the layer is complete.

Multiple layers are accumulated into a "cascade" by this process until the overall performance requirements are achieved. A cascade of N layers has a performance where the overall DR is the product of the detection rates of the individual layers and the overall FAR is the product of the false acceptance rates of the individual layers. If all layers have the same performance, the overall DR is the DR of one layer taken to the Nth power, and similarly for the FAR. If the DR for each layer is nearly 1, and the FAR is close to zero, the addition of each new layer has the effect of driving the FAR lower and lower, while leaving the DR only very slightly diminished.

With respect to feature selection during the training process discussed above, one embodiment utilizes a Forward Feature Selection (FFS) process. This allows fewer features to be used than conventional AdaBoost systems while achieving the same or better performance. One example of a FFS process is given in J. Wu, C. Brubaker, M Mullin, and J. Rehg, Fast asymmetric learning for cascade face detection, IEEE Trans: on Pattern Analysis and Machine Intelligence, 30(3), 369-382, January 2008, which is hereby incorporated by reference in its entirety. One embodiment of the present invention uses the FFS process to build classifier cascade layers. This separates apart two functions which are intermingled in classic AdaBoost trainers: feature selection and feature weighting.

Unlike AdaBoost, the FFS process does not change the training population, and all selected features (weak classifiers) are treated equally in the ensemble. Therefore, by implementing the FFS process during AdaBoost training, all the features can be trained just once, and the results saved in a table in which a row corresponds to a feature and a column corresponds to a sample. Features can be selected incrementally, by inspecting the table. The candidate features are compared to find the one that, by adding it to the ensemble (which is initially empty), produces the lowest classification error. Since the number of votes of the ensemble for any sample is an integer in the range [0, t], where t is the number of features in the ensemble, histograms can be calculated to determine the threshold for the ensemble, instead of having to perform a sort.

A feature weighting process is also used in one embodiment. One example of a feature weighting process is Linear Asymmetric Classifier (LAC), which is further discussed in Wu et al. In one embodiment, each layer is an ensemble classifier where all chosen weak classifiers (features) are evaluated, and a weighted sum of the results is compared against the threshold of the layer classifier to determine acceptance or rejection. The coefficients are chosen to maximize the detection rate, while holding the false accept rate at, for example, 50%. The false accept rate of the entire classifier can be driven arbitrarily low by use of multiple layers. This treatment of the coefficients assigns far less cost to a false accept than to a false reject, which is advantageous to have when building a sliding window localizer (which typically generates vastly more windows which are negative samples than positive). The few positive examples are important and should not be lost.

In some instances, as features are added to the ensemble, the detection rate can oscillate and sometimes not converge. This can be traced to the fact that sometimes FFS selects two features that produced the same classification over the positive training set. An offsetting $\lambda$ can be added to the diagonal matrix elements to overcome this, but even if a fairly large $\lambda$ is used, some weak classifier weights can turn negative. Even when two features produced are very similar, although not identical, classifications, calculating the inverse matrix becomes numerically unstable.

Therefore, one embodiment overcomes this numerical instability problem as follows. In the feature selection layer, for every new feature chosen by FFS, its classification is compared with the classifications of previously selected features, one by one. If one difference is less than a threshold (e.g. 5%), the new feature is discarded. And in the LAC formation layer, if it is found that a weak classifier has a negative weight, it is removed from the ensemble classifier. Since these two methods operate at different times in the training, both of them can be used.

As can be seen, the above training process results in a multiclass classifier whose basic elements are simple ensemble classification trees. The root of such a tree is an ensemble (set) of all classes that were trained for (one of which can be a "none of the above" class, which represents failure to find any object of interest). At each node in the tree, there is a test and binary decision, each branch of which denotes an ensemble which is a subset of its ancestor ensemble. Eventually this grounds out in single classes.

Figure 22:
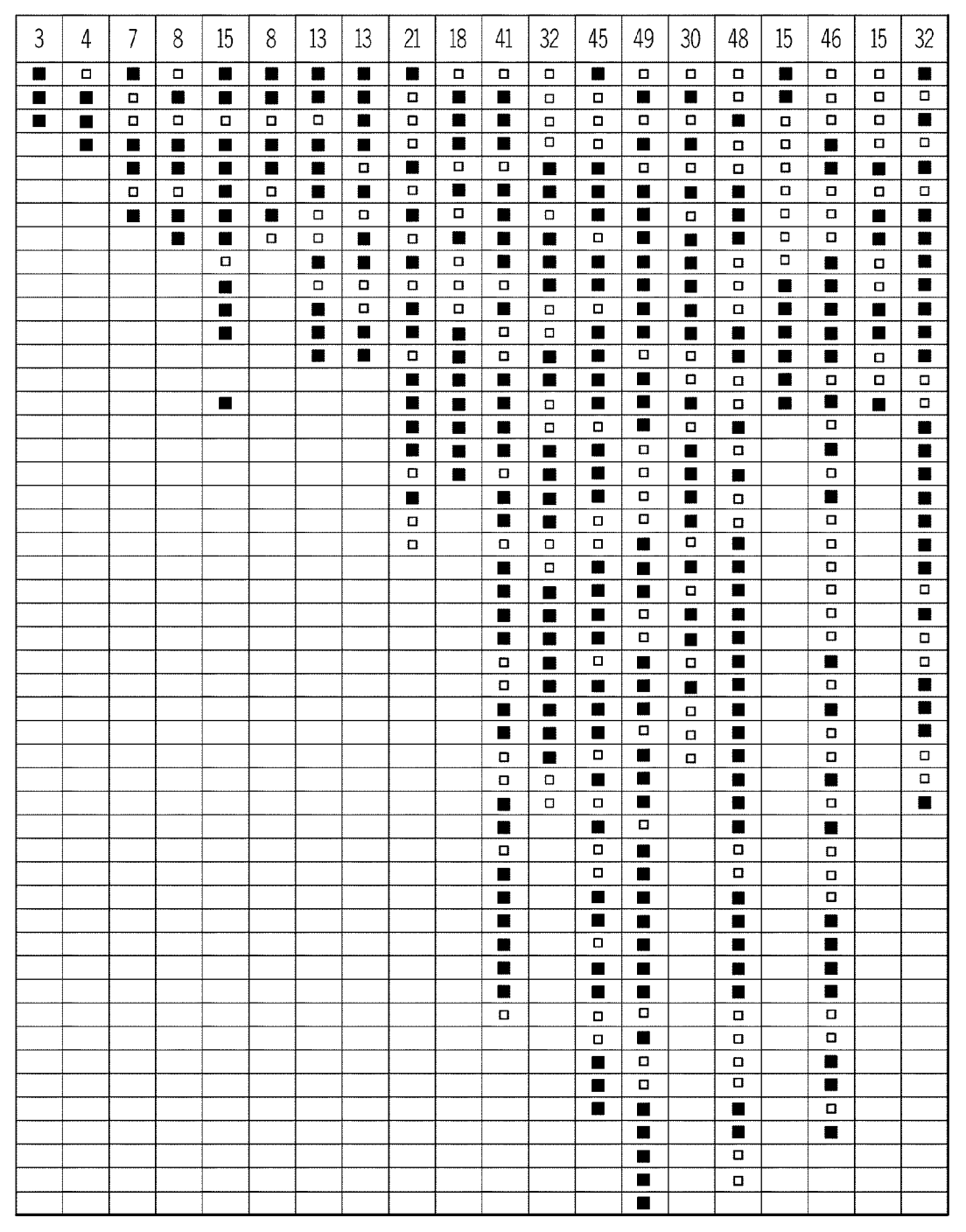

The test at each node is constructed (during training) as the application of a feature to the input and comparison of its numerical value to a threshold. The feature to be selected for the test is the one that is most informative (gives the cleanest separation of classes, based on the training samples) that has not already been used. In particular, all possible Haar and HOG features have been evaluated over the training data set, and are available for selection, they can be freely intermixed at successive nodes, as shown in FIG. 22. In particular, FIG. 22 shows an AdaBoost-trained classifier. The columns are the layers in the cascade, the leftmost being Layer 1. The column heading is the number of weak classifiers in that layer. The rows represent the feature (weak classifier) selections within each layer, in order. Large squares indicate that a HOG feature was selected; small squares indicate that a Haar feature was selected.

Figure 23:
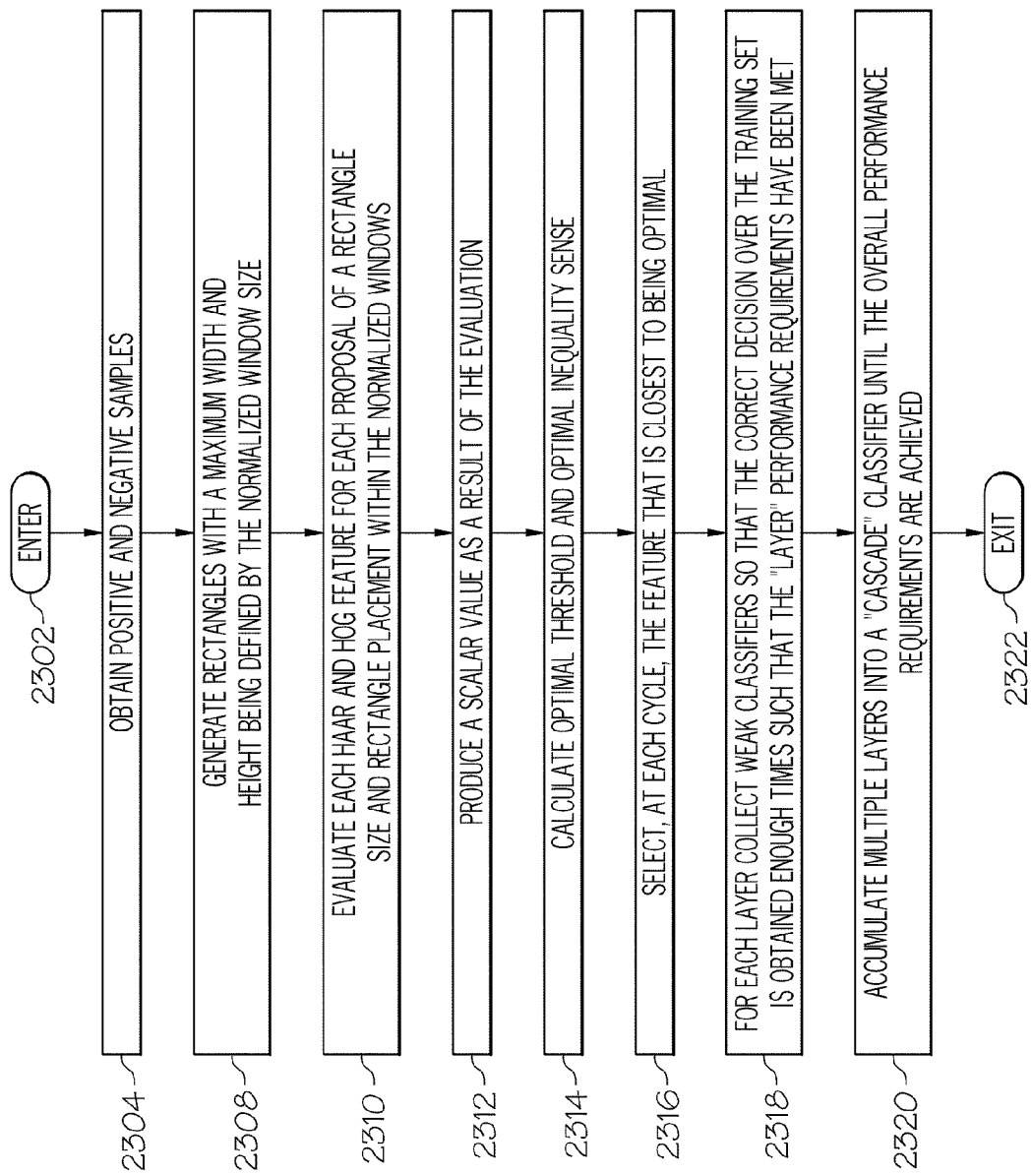
FIG. 23 is an operational flow diagram illustrating one process for training the cascade-boosted detector of FIG. 18 according to one embodiment of the present invention.

FIG. 23 is an operational flow diagram for the training process above. It should be noted that a more detailed discussion on each step of the flow diagram in FIG. 23 has already been given above. The operational flow begins at step 2302 and flows directly to step 2304. The training process, at step 2304, receives positive and negative samples. The training process, at step 2308, generates rectangles up to a maximum width and height that are defined by a normalized window size which the rectangles are to be placed.

The training process, at step 2310, evaluates each Haar and HOG feature for each proposal of a rectangle size and rectangle placement within the normalized window(s). A scalar value, at step 2312, is produced as a result of the evaluation. The training process, at step 2314, calculates an optimal threshold and an optimal inequality sense. The training process, at step 2316, selects, at each cycle of selecting a weak classifier, the feature that is closest to being optimal. The training process, at step 2318, collects weak classifiers for each level, so that the correct decision over the training set is obtained frequently enough such that the "layer" performance requirements have been met. The training process, at step 2320, accumulates multiple layers into a "cascade" classifier until the overall performance requirements are achieved. The control flow then exits at step 2322.

Information Processing System

Figure 25:
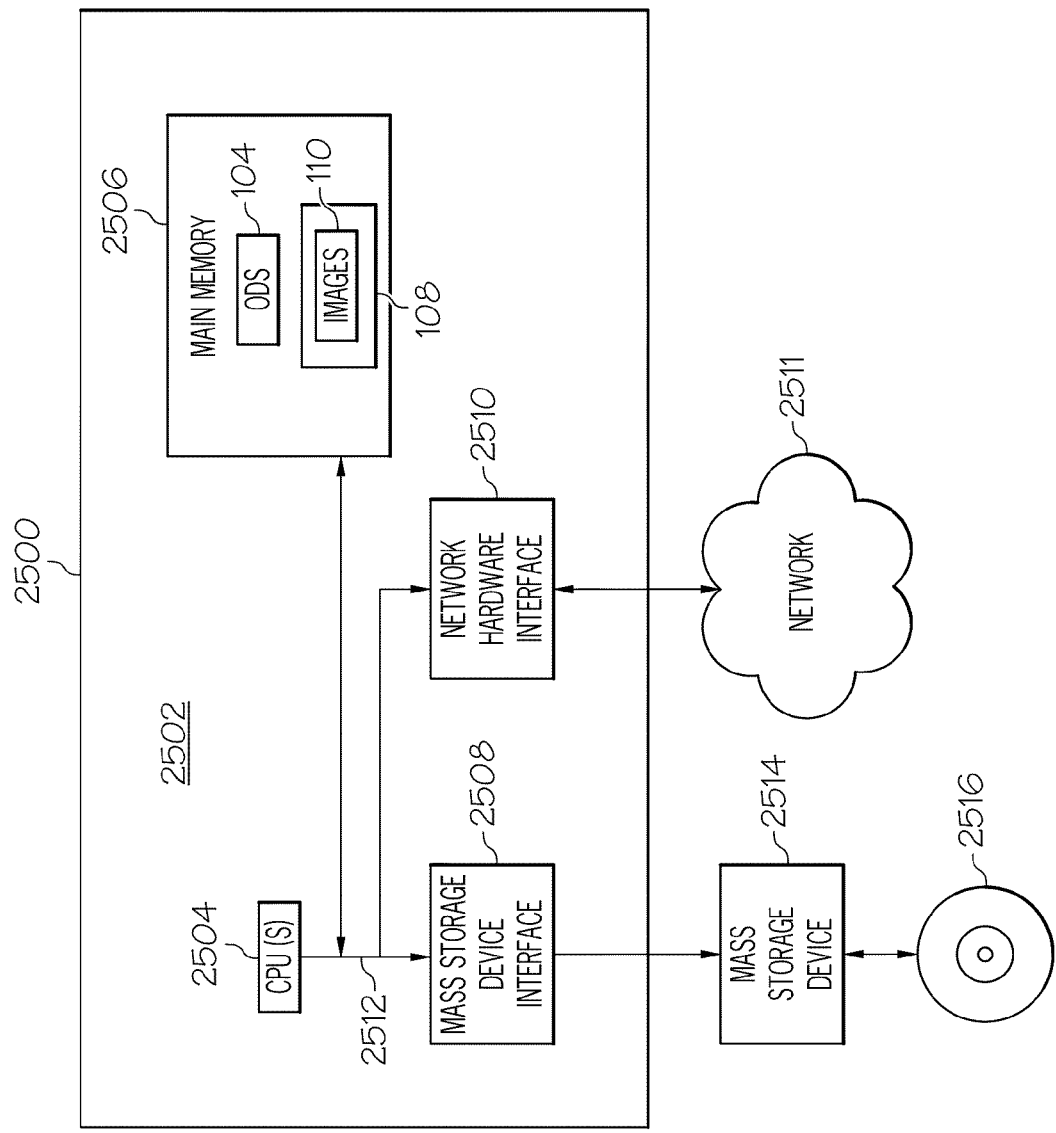
FIG. 25 is a block diagram illustrating a more detailed view of an information processing system according to one embodiment of the present invention.

FIG. 25 is a block diagram illustrating an information processing system that can be utilized in embodiments of the present invention. The information processing system 2500 is based upon a suitably configured processing system adapted to implement one or more embodiments of the present invention (e.g., the system 102 of FIG. 1). Any suitably configured processing system can be used as the information processing system 2500 in embodiments of the present invention.

The information processing system 2500 includes a computer 2502. The computer 2502 has a processor(s) 2504 that is connected to a main memory 2506, mass storage interface 2508, and network adapter hardware 2510. A system bus 2512 interconnects these system components. Although only one CPU 2504 is illustrated for computer 2502, computer systems with multiple CPUs can be used equally effectively. The main memory 2506, in this embodiment, comprises the object detection system 104 and its components, the image database 108, and the images 110.

The mass storage interface 2508 is used to connect mass storage devices, such as mass storage device 2514, to the information processing system 2500. One specific type of data storage device is an optical drive such as a CD/DVD drive, which can be used to store data to and read data from a computer readable medium or storage product such as (but not limited to) a CD/DVD 2516. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 2500. The network adapter hardware 2510 is used to provide an interface to a network 2511. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, CD-ROM, or other form of recordable media, or via any type of electronic transmission mechanism. Also, aspects of the present invention may take the form of an entirely hardware embodiment, an entirely software embodiment (including firmware, resident software, micro-code, etc.), or an embodiment combining software and hardware aspects that may all generally be referred to herein as a "circuit" "module" or "system".

Any combination of one or more computer readable medium(s) may be utilized. The computer readable medium may be a computer readable signal medium or a computer readable storage medium A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An information processing system for detecting objects in a digital image, the information processing system comprising:
    a memory;
    a processor communicatively coupled to the memory; and
    an object detection system communicatively coupled to the memory and the processor, the object detection system configured to perform a method comprising:
        receiving at least one image representing at least one frame of a video sequence of an external environment;
        extracting a given color channel of the at least one image;
        identifying at least one blob that stands out from a background of the given color channel that has been extracted;

extracting one or more features from the at least one blob that has been identified;

providing the one or more features that have been extracted to a plurality of pre-learned object models each comprising a set of pre-defined features associated with a pre-defined blob type;

comparing, in response to the providing, the one or more features to the set of pre-defined features of each of the plurality of pre-learned object models;

determining, based on the comparing, that the at least one blob is of a type that substantially matches a pre-defined blob type associated with one of the pre-learned object models; and visually indicating, in response to the determining, at least a location of an object within the at least one image that corresponds to the at least one blob.

2. The information processing system of claim 1, wherein the method performed by the information processing system further comprises:

applying a bounding box around the at least one blob;

analyzing two or more corner regions of the bounding box; and determining a rough shape of the at least one blob based on the two or more corner regions comprising one of a portion of background and a potential portion of the at least one blob.

3. The information processing system of claim 1, wherein the method performed by the information processing system further comprises:

determining that a classification probability of the at least one blob with respect to the plurality of pre-learned object models is below a given threshold;

comparing the at least one blob with one or more blobs from at least one preceding image that has been assigned a blob type from the plurality of pre-learned object models;

determining that the at least one blob substantially matches with at least one of the one or more blobs; and assigning the at least one blob to the blob type that has been assigned to the at least one of the one or more blobs in the at least one preceding image.

4. The information processing system of claim 1, wherein the method performed by the information processing system further comprises:

tracking the object for at least one or more subsequent images, wherein the tracking comprises:

identifying a search area S in the one or more subsequent images; and localizing the object within S.

5. The information processing system of claim 4, wherein identifying the search area S comprises:

determining a size of S based on a size of the object within the at least one image, and a moving direction of the object, wherein the moving direction is based on a displacement of the object in an x-direction and a y-direction in a preceding image of the at least one image, wherein the size of the search area S is further determined based on a size change of the object from a preceding image to the at least one image and a size of the object in the at least one image.

6. A computer program product for detecting objects in a digital image, the computer program product comprising:

a non-transitory storage medium readable by a processing circuit and storing instructions for execution by the processing circuit for performing a method comprising:

receiving at least one image representing at least one frame of a video sequence of an external environment;

extracting a given color channel of the at least one image;

identifying at least one blob that stands out from a background of the given color channel that has been extracted;

extracting one or more features from the at least one blob that has been identified;

providing the one or more features that have been extracted to a plurality of pre-learned object models each comprising a set of pre-defined features associated with a pre-defined blob type;

comparing, in response to the providing, the one or more features to the set of pre-defined features of each pre-learned object model;

determining, based on the comparing, that the at least one blob is of a type that substantially matches a pre-defined blob type associated with one of the pre-learned object models; and visually indicating, in response to the determining, at least a location of an object within the at least one image that corresponds to the at least one blob.

7. The computer program product of claim 6, wherein the instructions are further for:

applying a bounding box around the at least one blob;

analyzing two or more corner regions of the bounding box; and determining a rough shape of the at least one blob based on the two or more corner regions comprising one of a portion of background and a potential portion of the at least one blob.

8. The computer program product of claim 6, wherein the instructions are further for:

determining that a classification probability of the at least one blob with respect to the plurality of pre-learned object models is below a given threshold;

comparing the at least one blob with one or more blobs from at least one preceding image that has been assigned a blob type from the plurality of pre-learned object models;

determining that the at least one blob substantially matches with at least one of the one or more blobs; and assigning the at least one blob to the blob type that has been assigned to the at least one of the one or more blobs in the at least one preceding image.

9. The computer program product of claim 6, wherein the instructions are further for:

tracking the object for at least one or more subsequent images, wherein the tracking comprises:

identifying a search area S in the one or more subsequent images; and localizing the object within S.

10. The computer program product of claim 8, wherein identifying the search area S comprises:

determining a size of S based on a size of the object within the at least one image, and a moving direction of the object, wherein the moving direction is based on a displacement of the object in an x-direction and a y-direction in a preceding image of the at least one image, wherein the size of the search area S is further determined based on a size change of the object from a preceding image to the at least one image and a size of the object in the at least one image.

* * * * *